United States Patent
Appelquist et al.

(10) Patent No.: US 10,548,291 B2
(45) Date of Patent: Feb. 4, 2020

(54) TEATCUP

(71) Applicant: DELAVAL HOLDING AB, Tumba (SE)

(72) Inventors: Johanna Appelquist, Tumba (SE); Thomas Johansson, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 288 days.

(21) Appl. No.: 15/536,876

(22) PCT Filed: Dec. 14, 2015

(86) PCT No.: PCT/SE2015/051332
§ 371 (c)(1),
(2) Date: Jun. 16, 2017

(87) PCT Pub. No.: WO2016/099384
PCT Pub. Date: Jun. 23, 2016

(65) Prior Publication Data
US 2017/0347616 A1    Dec. 7, 2017

(30) Foreign Application Priority Data
Dec. 19, 2014    (SE) ..................... 1451618

(51) Int. Cl.
*A01J 5/08* (2006.01)
*A01J 5/04* (2006.01)

(52) U.S. Cl.
CPC . *A01J 5/08* (2013.01); *A01J 5/044* (2013.01)

(58) Field of Classification Search
CPC ...... A01J 5/08; A01J 5/044; A01J 5/10; A01J 5/12; A01J 5/16
See application file for complete search history.

(56) References Cited

U.S. PATENT DOCUMENTS 3,255,732 A    6/1966 Raht
3,659,558 A *  5/1972 Noorlander ............... A01J 5/08
                                                    119/14.36
(Continued)

FOREIGN PATENT DOCUMENTS

DE    3 408 655 A1    9/1985
DE    3 419 615 A1    11/1985
(Continued)

OTHER PUBLICATIONS

International-Type Search Report, dated Sep. 18, 2015, from corresponding PCT application.
(Continued)

*Primary Examiner* — Trinh T Nguyen
(74) *Attorney, Agent, or Firm* — Young & Thompson

(57) ABSTRACT

A teatcup includes a sleeve, a teacup liner provided in the sleeve, and a milk receptacle including a milk space. An inlet channel extends between an inner space of the teatcup liner and the milk space for conveying milk from a teat into the milk space. An outlet channel extends from the milk space and is connectable to a milk conduit for conveying the milk in a milk flow from the milk space. A gas supply channel conveys a gas into the milk space for promoting the milk flow. The gas supply channel has an inlet communicating with a gas source, and an outlet into the milk space. The milk space is partly delimited by a side wall. The gas supply channel extends within the side wall and along a surface of the side wall.

14 Claims, 7 Drawing Sheets

(56) References Cited

U.S. PATENT DOCUMENTS

| | | | |
|---|---|---|---|
| 4,441,454 A | | 4/1984 | Happel et al. |
| 4,840,141 A | * | 6/1989 | Marshall ............. A01J 5/04 |
| | | | 119/14.47 |
| 5,134,967 A | * | 8/1992 | Marshall ............. A01J 5/044 |
| | | | 119/14.47 |
| 5,178,095 A | * | 1/1993 | Mein ............. A01J 5/007 |
| | | | 119/14.02 |
| 5,568,788 A | | 10/1996 | Van Den Berg et al. |
| 6,546,893 B1 | * | 4/2003 | Happel ............. A01J 5/08 |
| | | | 119/14.47 |
| 8,176,872 B2 | | 5/2012 | Crespo |
| 8,356,576 B2 | | 1/2013 | Laney et al. |
| 8,485,129 B2 | | 7/2013 | Wulle et al. |
| 2017/0164575 A1 | * | 6/2017 | Alveby ............. A01J 5/16 |
| 2019/0124880 A1 | * | 5/2019 | Samuelsson ............. A01J 5/16 |

FOREIGN PATENT DOCUMENTS

| | | |
|---|---|---|
| EP | 0 566 977 A1 | 10/1993 |
| SE | 0002401-8 L | 4/2001 |
| WO | 81/03412 A1 | 12/1981 |
| WO | 96/17509 A1 | 6/1996 |
| WO | 2005/102035 A2 | 11/2005 |
| WO | 2013/095291 A1 | 6/2013 |

OTHER PUBLICATIONS

International Search Report, dated Mar. 18, 2016, from corresponding PCT application.

* cited by examiner

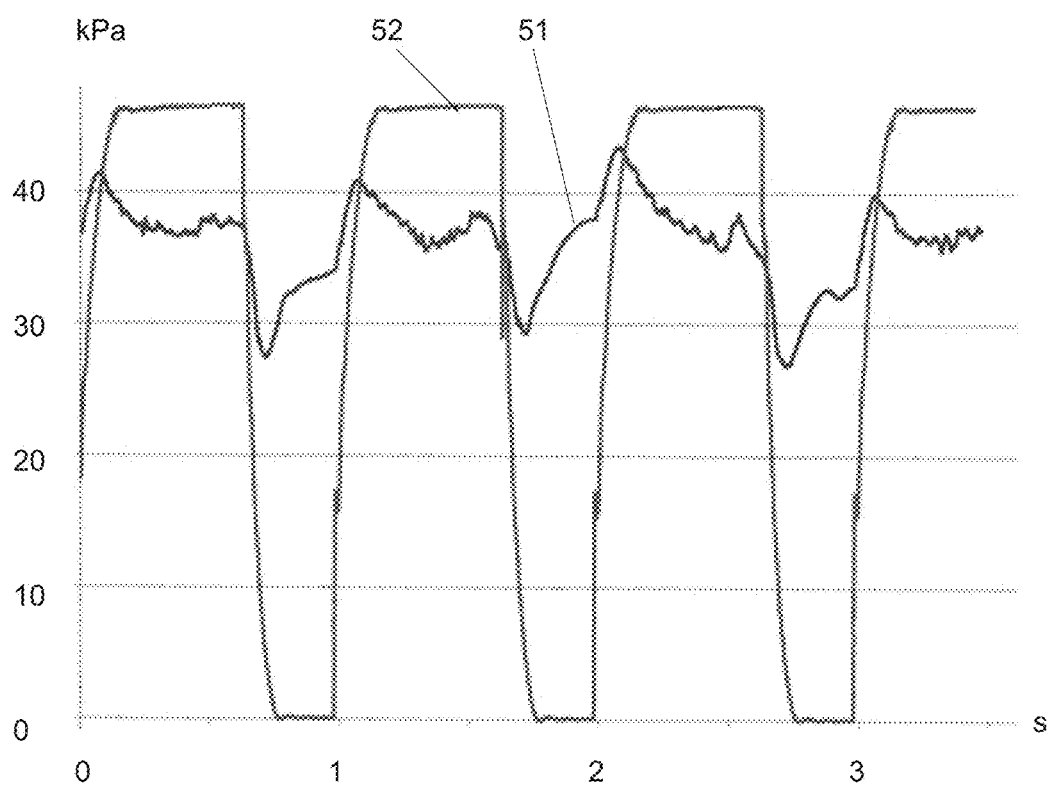

TEATCUP

TECHNICAL FIELD OF THE INVENTION

The present invention refers to a teatcup.

BACKGROUND OF THE INVENTION AND PRIOR ART

In order to promote the milk flow from the teatcup to a milk receiving unit, gas is commonly supplied to the milk flow. The general purpose of the gas supply, for instance in the form of a flow of air to the milk flow, is thus to create an efficient and a uniform milk flow from the teatcup to the milk receiving unit. Traditionally, the supply of gas took place via the so called teatcup claw. In quarter milking, it is known to supply the gas via the teatcup, for instance into a milk space created beneath the teat. However, the supply of gas into the milk space is an area of some concern.

SE-L-0002401-8 discloses a teatcup of the kind initially defined, which comprises a sleeve, a teatcup liner provided in the sleeve and a milk receptacle comprising a milk space. An inlet channel extends between an inner space of the teatcup liner and the milk space for conveying milk from a teat of an animal to be milked into the milk space. An outlet channel extends from the milk space and is formed by a first nipple connected to a milk conduit for conveying the milk in a milk flow from the milk space. A valve member is provided for conveying air into the milk space for promoting the milk flow. The air passes the valve member straight into the milk space directly from outside the teatcup.

A teatcup, similar to the one of SE-L-0002401-8, is disclosed in EP-566 977. The teatcup disclosed in this document comprises a valve housing at the lower end. The valve housing forms a milk space beneath the teat. An air aperture extends through the wall of the valve housing.

Investigations performed by the applicant have shown that high vacuum variations may occur at the teat tip in the milk space in teatcups of this kind and that the evacuation of the milk may be poor during high milk flow conditions. It is believed that these problems may be overcome by creating a large volume of the milk space beneath the teat. However, the investigations also show that such a large volume is not sufficient in order to eliminate the problems.

Moreover, air supplied to the milk flow, for instance via the milk space, may be detrimental to the quality of the milk, in particular if there is a jet of air hitting the milk contained in the milk space.

A further problem is that the air, where the milking takes place in the immediate vicinity of the animal may be contaminated, and thus not suitable for being mixed with the milk.

SUMMARY OF THE INVENTION

The object of the present invention is to overcome the problems discussed above and to provide an improved and controlled supply of gas to the milk flow in a milking equipment in order to obtain an efficient and a uniform milk flow.

This object is achieved by the teatcup defined above, which is characterized in that the gas supply channel extends within the side wall and along a surface of the side wall.

The gas supply channel within the side wall enables a significant length of the gas supply channel, which is advantageous in order to create a controlled flow of gas, such as a laminar flow of gas, into the milk space. A controlled flow of gas contributes to an efficient and uniform milk flow and low vacuum variations.

Furthermore, the outlet of the gas supply channel may be located at an advantageous position, especially close to the inlet channel for the milk, and thus above the level of the milk collected in the milk space.

Moreover, such an extension of the gas supply channel within the side wall makes it possible to have the inlet located in the proximity of the connection to the milk conduit. A conduit extending along the milk conduit may thus in an easy manner be connected to the inlet for supplying gas, such as air, to the milk space from a remote position, where the gas is clean.

According to a further embodiment of the invention, the gas supply channel has a constant flow area along its length from the inlet to the outlet. Such a constant flow area is advantageous in order to ensure a controlled flow of gas, such as a laminar flow of gas.

According to a further embodiment of the invention, the gas supply channel has an inner diameter of between 2 and 4 mm, preferably between 2.6 and 3.6 mm. Such a relatively large inner diameter contributes to a relatively low velocity of the flow of gas to the milk space without reducing the amount of gas supplied to the milk space.

According to a further embodiment of the invention, the inlet of the gas supply channel is configured to be connected to a gas conduit extending from the gas source. Such a gas conduit makes it possible to supply gas from a position remote from the area in which the teatcup is located.

According to a further embodiment of the invention, the gas conduit has an inner diameter that is equal to, or substantially equal to, the inner diameter of the gas supply channel.

According to a further embodiment of the invention, the gas may be air, wherein the gas source may be the surrounding atmosphere. The gas conduit, permitting supply of air from a remote position, is advantageous in this case, since the air close to the teatcup may be contaminated.

According to a further embodiment of the invention, the milk space comprises an upper part space, from which the inlet channel extends and a lower part space, from which the outlet channel extends, wherein the outlet is located in the upper part space. By positioning the outlet at the upper part space, the outlet will be relatively close to the inlet channel and the gas may enter the milk space above the level of milk. Such a position of the outlet close to the teat tip contributes to low vacuum variations.

According to a further embodiment of the invention, the side wall comprises a recess defined by a recess surface, wherein the outlet of the gas supply channel is located in the recess, and wherein the gas supply channel extends to the recess in a direction passing through the recess surface, through the recess and again through the recess surface. Thanks to the provision of the recess into which the gas supply channel extends, a further controlled flow of gas may be ensured. The flow of gas will be redirected by the recess surface when entering the milk space before leaving the recess. There will thus be no jet of gas hitting the milk of the milk flow through the milk space.

According to a further embodiment of the invention, the recess forms a part of the milk space.

According to an embodiment of the invention, the recess surface is at least partly concave at least opposite to the outlet of the gas supply channel. Especially, the recess surface may be at least partly concave, or concavely domed, at least opposite to the outlet where said direction again passes through the recess surface. Such a concave, or concavely domed, recess surface further promote a careful redirection of the gas entering the milk space.

According to a further embodiment of the invention, the milk receptacle comprises a pulsation space, which communicates with a pulsation chamber between the sleeve and the teatcup liner, and a pulse inlet configured to be connected to a pulse conduit for the transport of a pulsation medium to the pulsation chamber via the pulsation space.

According to a further embodiment of the invention, the pulsation space and the milk space are arranged beside each other and separated from each other by the side wall forming a partition between the milk space and the pulsation space. Such a separate pulsation space may be available for sensing or measuring the pulsation performance without the need of opening the milk path, i.e. the inlet channel, the milk space, the outlet channel and the milk conduit. Sensing means may be introduced into the pulsation space and removed therefrom without affecting the milk path.

According to a further embodiment of the invention, the pulsation space has a circular cylindrical shape with a transverse axis extending through the side wall. Such a cylindrical shape is advantageous with regard to the manufacturing of the teatcup and the milk receptacle, and permits injection moulding.

According to a further embodiment of the invention, the pulsation space has a pulsation space opening through which the transverse axis extends and which is closed by a circular pulsation space cover.

According to a further embodiment of the invention, the circular pulsation space cover is removable from the pulsation space opening. The removability facilitates cleaning and maintenance of pulsation space.

The circular shape of the pulsation space cover ensures a tight abutment against the pulsation space opening, which also may be circular.

According to a further embodiment of the invention, the circular pulsation space cover comprises means for sensing or supervising the pulsation medium in the pulsation space. Such sensing means permits sensing without removing any conduits or hoses from the teatcup. Such sensing means may comprise a pressure sensor for sensing, preferably momentarily, the pressure of the pulsation medium.

According to a further embodiment of the invention, the pressure sensor is configured to communicate with a control unit having a processor for calculating the pressure of the pulsation medium over the time.

According to a further embodiment of the invention, the milk space has a circular cylindrical shape with a transverse axis extending through the side wall. Such a cylindrical shape is advantageous with regard to the manufacturing of the teatcup and the milk receptacle, and permits injection moulding.

According to a further embodiment of the invention, the milk space has a milk space opening through which the transverse axis extends and which is closed by a circular milk space cover.

According to a further embodiment of the invention, the circular milk space cover is removable from the milk space opening. The removability facilitates cleaning and maintenance of milk space.

The circular shape of the milk space cover ensures a tight abutment against the milk space opening, which also may be circular.

According to a further embodiment of the invention, the circular milk space cover comprises means for sensing or supervising the milk in the milk space. Such sensing means permits sensing without removing any conduits or hoses from the teatcup. Such sensing means may comprise a conductivity sensor for sensing, preferably momentarily, the conductivity of the milk. The conductivity may be used to detect any infection in the udder quarter of the animal.

According to a further embodiment of the invention, the conductivity sensor is configured to communicate with a control unit having a processor.

According to a further embodiment of the invention, the milk receptacle comprises a connection portion comprising a milk connection for enabling connection of the outlet channel to the milk conduit, a gas connection for enabling connection of the inlet to the gas conduit, and a pulse connection for enabling connection of the pulse inlet to the pulse conduit.

According to a further embodiment of the invention, the milk connection comprises a milk nipple, the gas connection comprises a gas nipple and the pulse connection comprises a pulse nipple, wherein the milk nipple, the gas nipple and the pulse nipple extend in parallel with each other. Such an arrangement of the three nipples enables an easy attachment of the three conduits to the nipples.

According to a further embodiment of the invention, the milk conduit, the gas conduit and the pulse conduit are included in a common hose. The three conduits may extend in parallel with each other.

BRIEF DESCRIPTION OF THE DRAWING

The present invention is now to be explained more closely through a description of an embodiment with modifications thereof, and with reference to the drawings attached hereto.

FIG. 7 discloses a diagram indicating the milking vacuum level and the pulsating vacuum level.

DETAILED DESCRIPTION OF EMBODIMENTS

Figure 1:
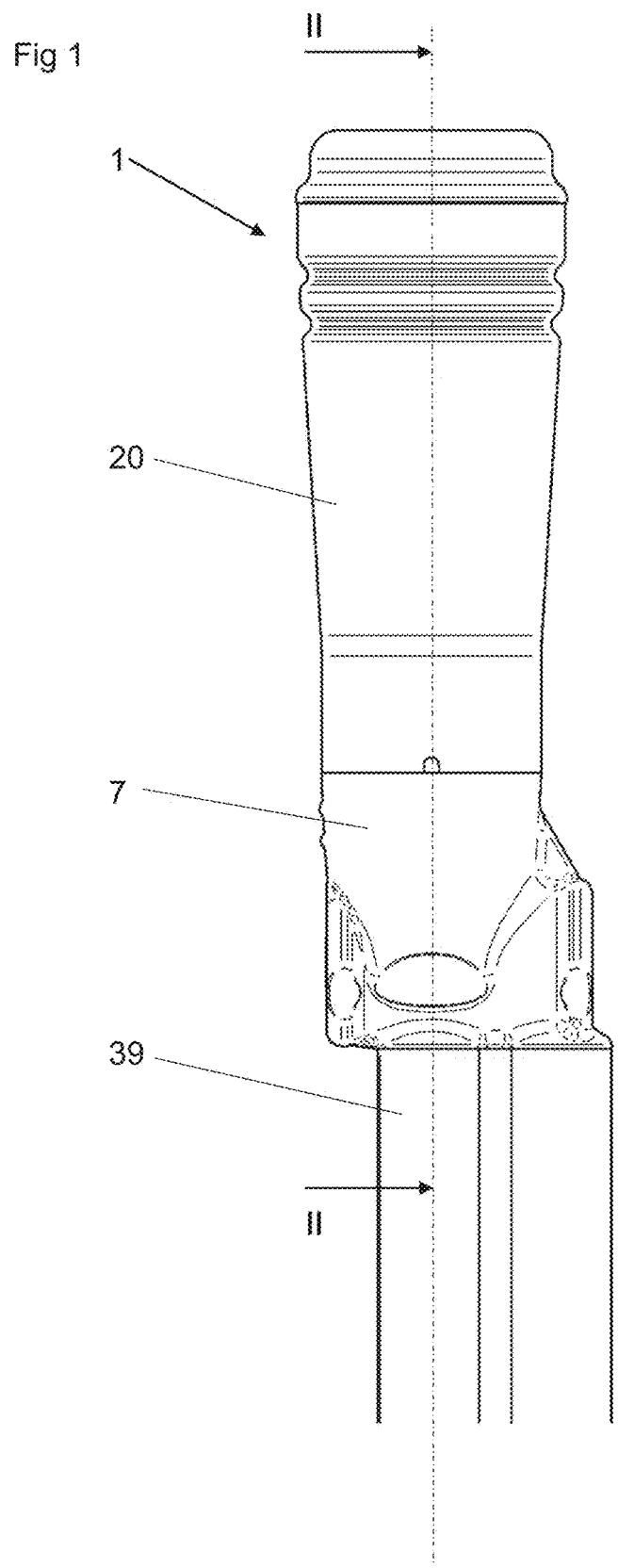
FIG. 1 discloses a side view of a teatcup according to an embodiment of the invention.

FIGS. 1 to 6 shows a teatcup 1 comprising a sleeve 2 and a teacup liner 3 provided in the sleeve 2 and adapted to receive a teat (not disclosed) of an animal to be milked. The teatcup 1 also comprises a lip 4 forming an opening through which the teat is introduced into an inner space 5 of the teatcup liner 3.

Figure 2:
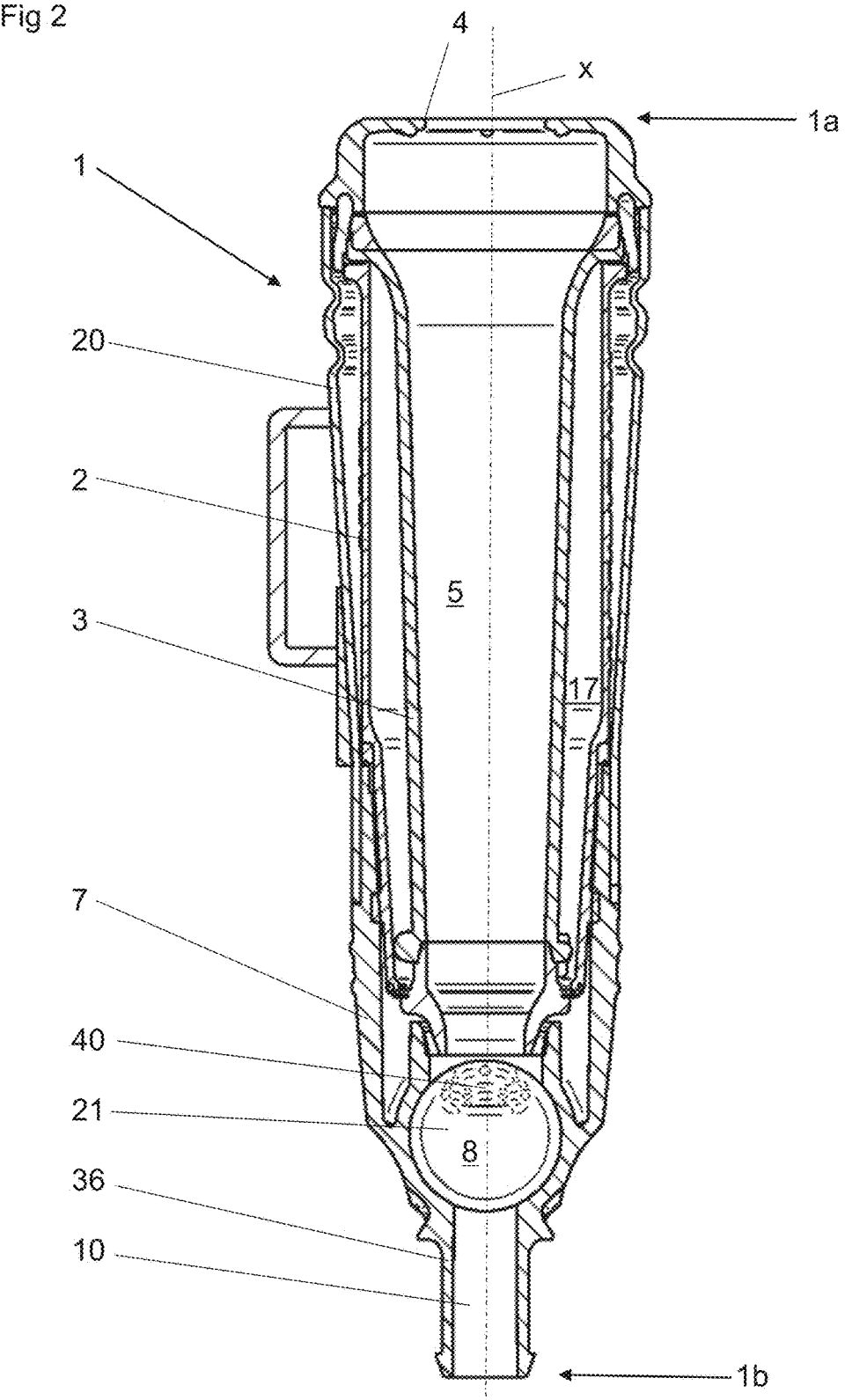
FIG. 2 discloses a longitudinal section of the teatcup along the line II-II in FIG. 1.
Figure 3:
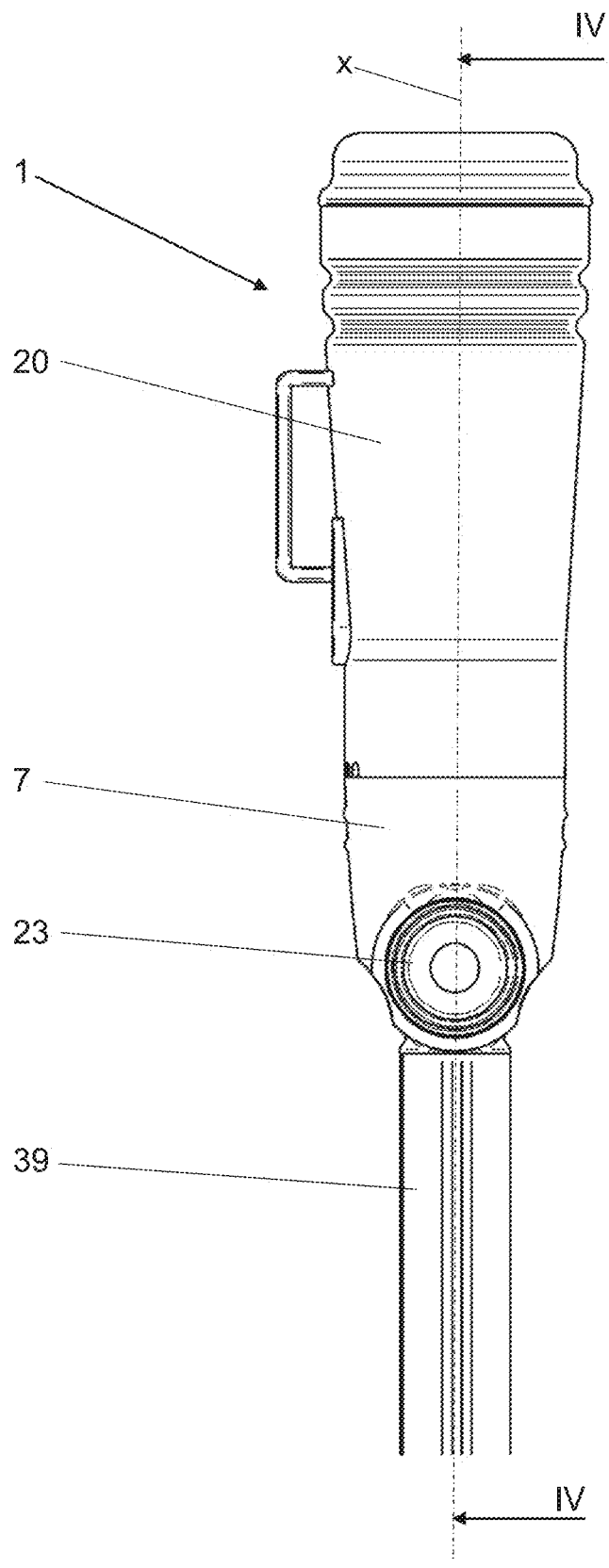
FIG. 3 discloses another side view of the teatcup in FIG. 1.

The lip 4 may be an integrated part of the teatcup liner 3, or an integrated part of a lip member as disclosed in FIG. 2.

The teatcup 1 has a first end 1a, which forms an upper end when attached to the teat, and a second end 1b. The lip 4 is located at the first end 1a.

The teatcup 1 defines a longitudinal axis x extending through the first end 1a and the second end 1b.

The teatcup 1 also comprises a milk receptacle 7, which comprises or defines a milk space 8.

An inlet channel 9 extends between the inner space 5 of the teatcup liner 3 and the milk space 8 for conveying milk from the teat of the animal to be milked into the milk space 8.

An outlet channel 10 extends from the milk space 8. The outlet channel 10 is configured to be connected to a milk conduit 11, see FIG. 4, for conveying the milk in a milk flow from the milk space 8. The outlet channel 10 extends to the second end 1b.

Figure 5:
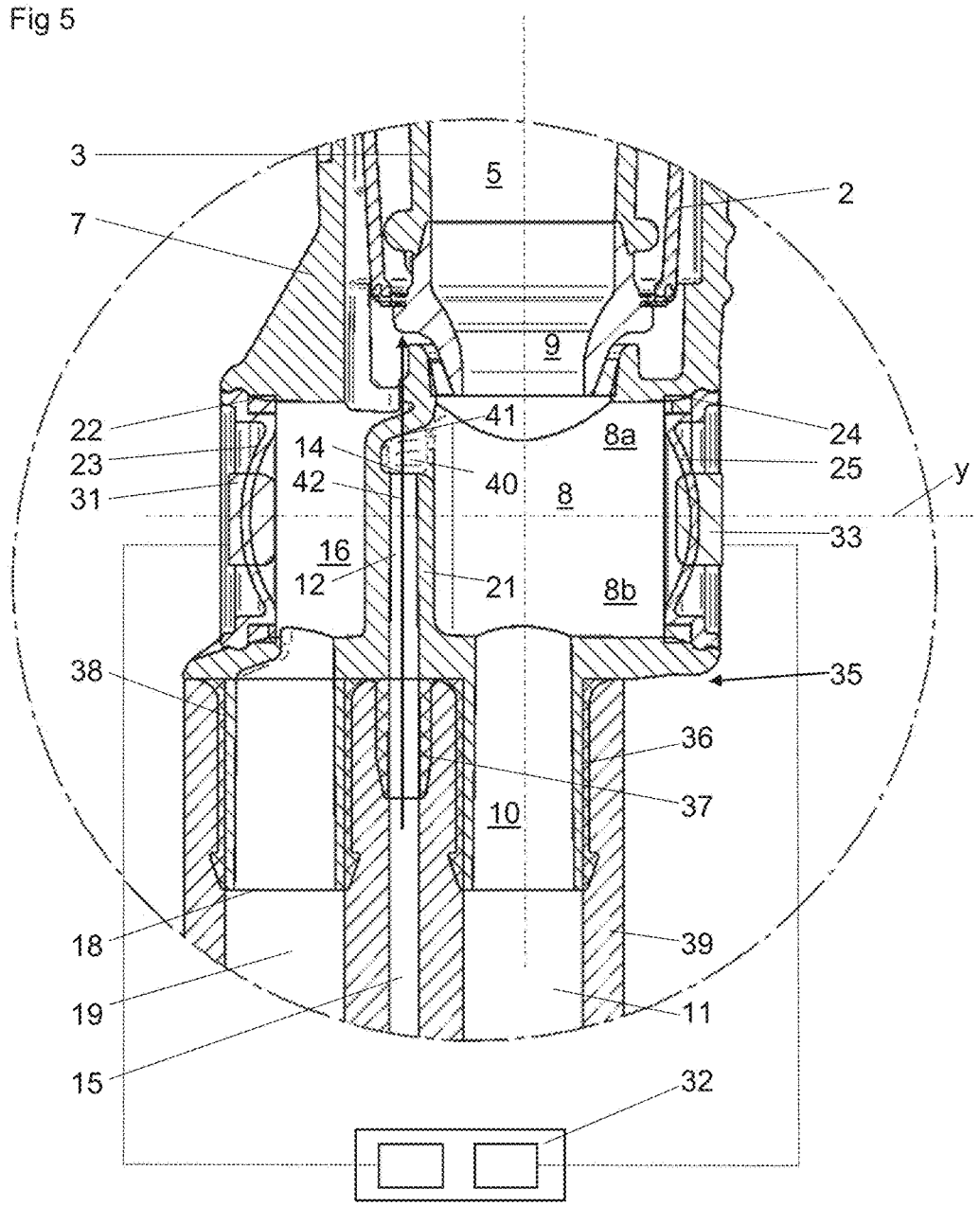
FIG. 5 discloses an enlarged view of a part of the teatcup in FIG. 4.
Figure 6:
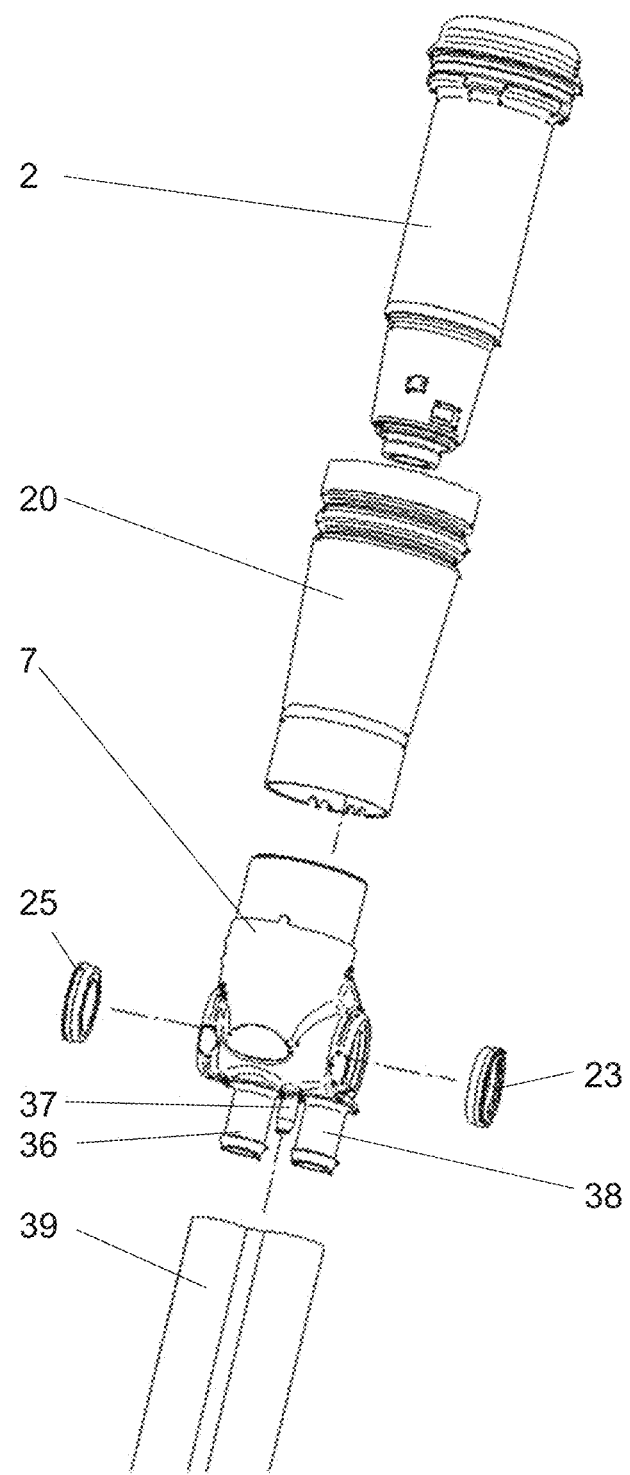
FIG. 6 discloses an exploded perspective view of the teatcup in FIG. 1.

A gas supply channel 12, see in particular FIG. 5, is provided for conveying a gas into the milk space 8 for promoting the milk flow. The gas supply channel 12 has an inlet 13, which communicates with a gas source, and an outlet 14 into the milk space 8. The inlet 13 of the gas supply channel 12 is configured to be connected to a gas conduit 15 extending from the gas source.

The gas source may be the surrounding atmosphere, i.e. the gas is air. Alternatively, the gas source may be formed by a container containing any suitable gas such as air, nitrogen, etc.

The gas conduit 15 may have a length permitting supply of gas, such as air, from a position remote from the teatcup 1 and from the position at which the milking takes place.

The milk receptacle 7 also comprises or defines a pulsation space 16, see in particular FIG. 5. The pulsation space 16 communicates with a pulsation chamber 17, which is provided between the sleeve 2 and the teatcup liner 3. A pulse inlet 18 extends from the pulsation space 16 and is configured to be connected to a pulse conduit 19 for the transport of a pulsation medium to the pulsation chamber 17 via the pulsation space 16.

In the embodiment disclosed, the sleeve 2, the teatcup liner 3 and the lip member form an integrated unit or a cartridge, see WO2013/0952291. The teatcup 1 also comprises an outer shell 20 outside the cartridge and the sleeve 2. The outer shell 20 may be attached to the milk receptacle 7, for instance by means of a press fit. The outer shell 20 may be made of metal, for instance steel, and provides a protection for the cartridge. The cartridge may be a replaceable unit which may be introduced into the outer shell 20 and the milk receptacle 7 to the position disclosed in FIG. 2.

The milk space 8 is partly delimited by a side wall 21. The side wall 21 may extend in parallel, or substantially in parallel, with the longitudinal axis x.

The pulsation space 16 and the milk space 8 are arranged beside each other and separated from each other by the side wall 21. The side wall 21 thus forms a partition between the milk space 8 and the pulsation space 16.

The pulsation space 16 has a circular cylindrical shape. A transverse axis y extends through pulsation space 16 and through the side wall 21. The transverse axis y forms a central axis of the circular cylindrical pulsation space 16.

The milk space 8 has a circular cylindrical shape. A transverse axis y extends through the milk space 8 and through the side wall 21. The transverse axis y forms a central axis of the circular cylindrical milk space 8.

In the embodiment disclosed, the transverse axis y of the milk space 8 and the transverse axis y of the pulsation space 16 coincide with each other. Moreover, the transverse axis y, common for the milk space 8 and the pulsation space 16, may be perpendicular, or substantially perpendicular, to the longitudinal axis x.

The pulsation space 16 has a pulsation space opening 22, which is circular. The transverse axis y extends through the pulsation space opening 22. In the embodiment disclosed, the pulsation space opening 22 is closed, or closable, by a circular pulsation space cover 23.

The circular pulsation space cover 23 may be removable. In the closed state, see FIG. 5, the circular pulsation space cover 23 abuts, or tightly abuts, the pulsation space opening 22 to seal the pulsation space 16 from the surrounding atmosphere.

The circular pulsation space cover 23 may be attached to the pulsation space opening 22 by means of a snap fit. A gasket (not disclosed) may be provided between the circular pulsation space cover 23 and the pulsation space opening 22.

The milk space 8 has a milk space opening 24, which is circular. The transverse axis y extends through the milk space opening 24. In the embodiment disclosed, and the milk space 8 is closed, or closable, by a circular milk space cover 25.

The circular milk space cover 25 may be removable. In the closed state, see FIG. 5, the circular milk space cover 25 abuts, or tightly abuts, the milk space opening 24 to seal the milk space 8 from the surrounding atmosphere.

The circular milk space cover 25 may be attached to the milk space opening 24 by means of a snap fit. A gasket (not disclosed) may be provided between the circular milk space cover 25 and the pulsation space opening 24.

The circular pulsation space cover 23 comprises means 31 for sensing or supervising the pulsation medium in the pulsation space 16. The sensing means 31 may comprise a pressure sensor for sensing, preferably momentarily, the pressure of the pulsation medium. The pressure sensor is configured to communicate with control unit 32 having a processor for calculating the pressure of the pulsation medium over the time.

Such a circular pulsation space cover 23 comprising the sensing means 31 may be used when sensing is to be performed. If no sensing is to be performed, a circular pulsation space cover 23 without sensing means may be used. Thanks to the removability, it is easy to alternate between a circular pulsation space cover 23 without sensing means and a circular pulsation space cover 23 with sensing means 31.

The circular milk space cover 25 comprises means 33 for sensing or supervising the milk in the milk space 8. The sensing means 33 may comprise a conductivity sensor for sensing, preferably momentarily, the conductivity of the milk. The sensing means, such as the conductivity sensor, is configured to communicate with the control unit 32 having a processor for processing a signal from the sensing means, such as the sensed conductivity.

Such a circular milk space cover 25 comprising the sensing means 33 may be used when sensing is to be performed. If no sensing is to be performed, a circular milk space cover 25 without sensing means may be used. Thanks to the removability, it is easy to alternate between a circular milk space cover 25 without sensing means and a circular milk space cover 25 with sensing means 33.

The milk receptacle 7 comprises a connection portion 35 comprising a milk connection (milk nipple) 36 for enabling connection of the outlet channel 10 to the milk conduit 11, a gas connection 37 (gas nipple) for enabling connection of the inlet 13 to the gas conduit 15, and a pulse connection 38 (pulse nipple) for enabling connection of the pulse inlet 18 to the pulse conduit 19. The milk nipple, the gas nipple and the pulse nipple extend in parallel with each other.

Moreover, in the embodiment disclosed, the milk nipple, the gas nipple and the pulse nipple extend in parallel, or substantially in parallel, with the longitudinal axis x. It should be noted however, that the extension of the milk nipple, the gas nipple and the pulse nipple may form an angle to the longitudinal axis x, at least when seen in the view of FIG. 2. The milk nipple, the gas nipple and the pulse nipple may thus be turned around the transverse axis y. This may be advantageous, especially when milking animals having low udders, i.e. teats reaching a position close to the ground.

Figure 4:
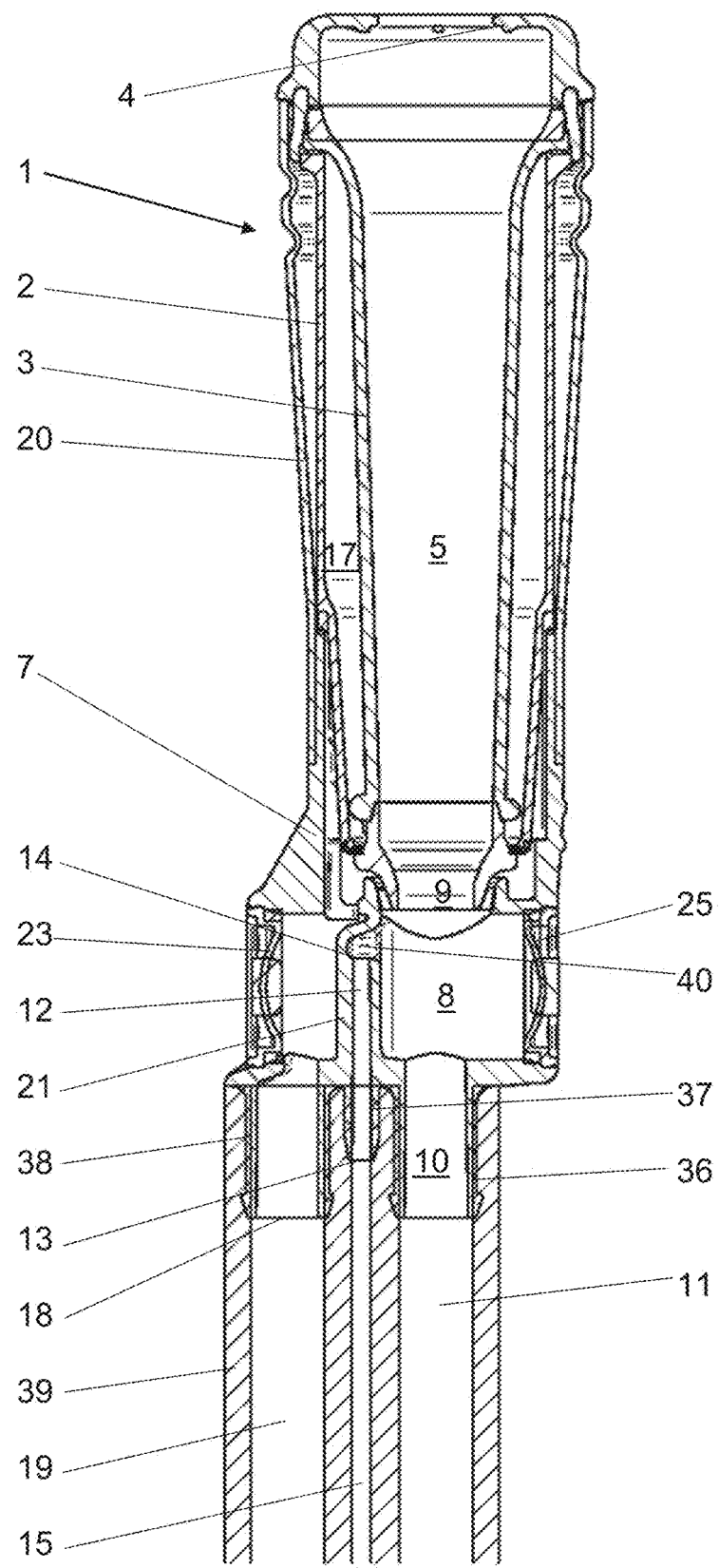
FIG. 4 discloses a longitudinal section along the line IV-IV in FIG. 3.

The milk conduit 11, the gas conduit 15 and the pulse conduit 19 are included in a common hose 39, see FIGS. 1 and 4. The three conduits 11, 15 and 19 extend in parallel with each other.

The gas supply channel 12 extends within the side wall 21. The gas supply channel 12 may extend straightly and along a surface of the side wall 21, for instance in parallel with a surface of the side wall 21. The surface of the side wall 21 may be the surface facing the milk space 8 and/or the surface facing the pulse space 16.

Moreover, the gas supply channel 12 may, as in the embodiment disclosed, extend in parallel, or substantially in parallel, with the longitudinal axis x.

The gas supply channel 12 has a constant flow area along its length from the inlet 13 to the outlet 14. Also the gas conduit 15 may have a constant flow area along its length. The flow area of the gas conduit 15 may be equal to the flow area of the gas supply channel 12.

The gas supply channel 12 has an inner diameter of between 2 and 4 mm, preferably between 2.6 and 3.6 mm, or more preferably between 2.8 and 3.4 mm, for instance 3.2 mm or approximately 3.2 mm. The inner diameter of the gas conduit 15 may be equal to the inner diameter of the gas supply channel 12.

The milk space 8 comprises an upper part space 8a above the transverse axis y and a lower part space 8b below the transverse axis y. The inlet channel 9 extends from the upper part space 8a. The outlet channel 10 extends from the lower part space 8b.

The outlet 14 of the gas supply channel 12 is located in the upper part space 8a, relatively close to the inlet channel 9 where the milk enters the milk space 8.

The side wall 21 comprises a recess 40 defined by a recess surface 41, see in particular FIG. 5. The recess 40 forms a part of the milk space 8.

The outlet 14 of the gas supply channel 12 is located in the recess 40. The gas supply channel 12 extends to the recess 40 in a direction 42 passing through the recess surface 41, through the recess 40 and again through the recess surface 41.

In the embodiment disclosed, the direction 42 of the gas supply channel 12 is parallel, or substantially parallel, with the longitudinal axis x.

The recess surface 41 is at least partly concave, or concavely domed, at least at a region opposite to the outlet 14, or in other words where the direction 42 again passes through the recess surface 42, as can be seen in FIG. 5. The concave recess surface 42 further promotes a careful redirection of the gas entering the milk space 8.

FIG. 7 discloses a diagram indicating the milking vacuum level 51 and the pulsating vacuum level 52 of a teatcup 1 as described in the present application. As can be seen the variation of the milking vacuum level 51 is moderate.

The present invention is not limited to the embodiments disclosed and discussed above, but may be varied and modified within the scope of the following claims.

The invention claimed is:

1. A teatcup comprising:
a sleeve;
a teatcup liner provided in the sleeve and having an inner space defined therein;
a milk receptacle housing a milk space partly delimited by a side wall having a recess opening directly into the milk space;
an inlet channel, extending between the inner space of the teatcup liner and the milk space to convey milk from a teat of an animal to be milked into the milk space;
an outlet channel, extending from the milk space and configured to be connected to a milk conduit to convey the milk in a milk flow from the milk space, the milk space being disposed between the inlet channel and the outlet channel; and
a gas supply channel configured to convey a gas through the recess in the side wall into the milk space to promote the milk flow, the gas supply channel having an inlet communicating with a gas source, and an outlet into the milk space, the gas supply channel extending within the side wall of the milk space and along a surface of the side wall,
wherein the inlet of the gas supply channel is configured to be connected to a gas conduit extending from the gas source,
wherein the milk receptacle comprises a connection portion comprising a milk nipple to enable connection of the outlet channel to the milk conduit, a gas nipple to enable connection of the inlet to the gas conduit, and a pulse nipple to enable connection of the pulse inlet to the pulse conduit, and
wherein the milk nipple, the gas nipple, and the pulse nipple extend in parallel with each other.

2. The teatcup according to claim 1, wherein the gas supply channel has a constant flow area along its length from the inlet to the outlet.

3. The teatcup according to claim 1, wherein the gas supply channel has an inner diameter of between 2 and 4 mm.

4. The teatcup according to claim 1, wherein the milk space comprises an upper part space, from which the inlet channel extends, and a lower part space, from which the outlet channel extends, the outlet being located in the upper part space.

5. The teatcup according to claim 1, wherein the recess is defined by a recess surface,
the outlet of the gas supply channel is located in the recess, and
the gas supply channel extends to the recess in a direction passing through the recess surface, through the recess and again through the recess surface.

6. The teatcup according to claim 1, wherein the milk receptacle comprises
a pulsation space, which communicates with a pulsation chamber between the sleeve and the teatcup liner, and
a pulse inlet configured to be connected to a pulse conduit for the transport of a pulsation medium to the pulsation chamber via the pulsation space.

7. The teatcup according to claim 6, wherein the pulsation space and the milk space are arranged beside each other and separated from each other by the side wall forming a partition between the milk space and the pulsation space.

8. The teatcup according to claim 7, wherein the pulsation space has a circular cylindrical shape with a transverse axis extending through the side wall.

9. The teatcup according to claim 8, wherein the pulsation space has a pulsation space opening through which the transverse axis extends and which is closed by a circular pulsation space cover.

10. The teatcup according to claim 9, wherein the circular pulsation space cover comprises a sensor configured to sense or supervise the pulsation medium in the pulsation space.

11. The teatcup according to claim 1, wherein the milk space has a circular cylindrical shape with a transverse axis extending through the side wall.

12. The teatcup according to claim 11, wherein the milk space has a milk space opening through which the transverse axis extends and which is closed by a circular milk space cover.

13. The teatcup according to claim 12, wherein the circular milk space cover comprises a sensor configured to sense or supervise the milk in the milk space.

14. A teatcup comprising:
a sleeve;
a teatcup liner provided in the sleeve and having an inner space defined therein;
a milk receptacle housing a milk space partly delimited by a side wall, the milk receptacle receiving an end portion of the teatcup liner and an end portion of the sleeve therein;
an inlet channel extending between an end of the teatcup liner and the milk space to convey milk from a teat of an animal to be milked into the milk space;
an outlet channel, extending from the milk space and configured to be connected to a milk conduit to convey the milk in a milk flow from the milk space, the milk space being disposed between the inlet channel and the outlet channel; and
a gas supply channel configured to convey a gas into the milk space to promote the milk flow, the gas supply channel having an inlet communicating with a gas source, and an outlet into the milk space, the gas supply channel extending within and through the side wall of the milk space,
wherein the inlet of the gas supply channel is configured to be connected to a gas conduit extending from the gas source,
wherein the milk receptacle comprises a connection portion comprising a milk nipple to enable connection of the outlet channel to the milk conduit, a gas nipple to enable connection of the inlet to the gas conduit, and a pulse nipple to enable connection of the pulse inlet to the pulse conduit, and
wherein the milk nipple, the gas nipple, and the pulse nipple extend in parallel with each other.

* * * * *